(12) United States Patent
Nonaka

(10) Patent No.: US 9,000,300 B2
(45) Date of Patent: Apr. 7, 2015

(54) INSULATED WIRE

(75) Inventor: Tsuyoshi Nonaka, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/878,826

(22) PCT Filed: Oct. 21, 2011

(86) PCT No.: PCT/JP2011/074288
§ 371 (c)(1),
(2), (4) Date: Apr. 11, 2013

(87) PCT Pub. No.: WO2012/063619
PCT Pub. Date: May 18, 2012

(65) Prior Publication Data
US 2013/0192871 A1     Aug. 1, 2013

(30) Foreign Application Priority Data
Nov. 10, 2010 (JP) .................. 2010-252035

(51) Int. Cl.
*H01B 3/30* (2006.01)
*H01B 3/42* (2006.01)
*C08L 101/16* (2006.01)

(52) U.S. Cl.
CPC .............. *H01B 3/421* (2013.01); *C08L 101/16* (2013.01)

(58) Field of Classification Search
CPC ............. B05D 5/08; C09K 3/00; H01B 3/421
USPC ..................... 174/110 SR, 121 SR
See application file for complete search history.

(56) References Cited

U.S. PATENT DOCUMENTS

2010/0016495 A1   1/2010   Taniguchi

FOREIGN PATENT DOCUMENTS

| | | |
|---|---|---|
| JP | A 6-142127 | 5/1994 |
| JP | A 11-170928 | 6/1999 |
| JP | A 2003-51215 | 2/2003 |
| JP | A 2003-308737 | 10/2003 |
| JP | A 2004-67146 | 3/2004 |
| JP | A 2007-191547 | 8/2007 |
| JP | A 2010-27387 | 2/2010 |
| JP | A 2010-143978 | 7/2010 |
| JP | A 2010-238657 | 10/2010 |
| WO | WO 2008/026632 A1 | 3/2008 |

OTHER PUBLICATIONS

JP 2003-51215 (machine translation).*
Matsushita et al; "Seibunkaisei Kobunshi Hydroxybutyrate/Valerate Kyojugotai no Impulse Zetsuen Hakai Tokusei;" Heisei 18 Nen National Convention Record I.E.E. Japan; Mar. 15, 2006; p. 12 (with translation).
Jan. 17, 2012 Search Report issued in International Patent Application No. PCT/JP2011/074288 (with translation).
Dec. 17, 2013 Office Action issued in Japanese Patent Application No. 2012-542858 (with translation).
Apr. 15, 2014 Office Action issued in Japanese Application No. 2012-542858 (with translation).
Dec. 31, 2014 Office Action issued in Chinese Application No. 201180054271.X.

* cited by examiner

*Primary Examiner* — Edward Cain
(74) *Attorney, Agent, or Firm* — Oliff PLC

(57) ABSTRACT

Provided is an insulated wire that is capable of reducing loads to the environment by containing a renewable biomass resource, and has excellent water resistance even if containing the biomass resource. The insulated wire includes a conductor, and an insulator that coats the perimeter of the conductor, wherein the insulator is made from a resin composition that contains a biodegradable resin having a repeating unit structure represented by the following general formula (1), and a repeating unit structure represented by the following general formula (2);

$$\left[ O - \underset{H}{\overset{R^1}{\underset{|}{C}}} - (CH_2)_a - \underset{O}{\overset{\|}{C}} \right] \quad (1)$$

$$\left[ O - \underset{H}{\overset{R^2}{\underset{|}{C}}} - (CH_2)_b - \underset{O}{\overset{\|}{C}} \right], \quad (2)$$

wherein each of $R^1$ and $R^2$ represents an alkyl group having one or more carbon atoms, and each of a and b represents a natural number of one or more.

5 Claims, No Drawings

INSULATED WIRE

TECHNICAL FIELD

The present invention relates to an insulated wire, and more specifically relates to an insulated wire favorably used in an automobile or an electrical/electronic appliance.

BACKGROUND ART

Conventionally known are insulated wires for automobile use or electrical/electronic appliance use, which include insulators (insulation coats) made from resins derived from fossil resources (oil resources) such as polyolefin. As is well known, the fossil resources are limited resources, and disposing of products made from the fossil resources by incineration increases carbon dioxide level in the air.

Recently, biomass resources have been receiving widespread attention from the viewpoint of global environmental conservation. The biomass resources define resources of biologic origin such as plant-derived resources that are renewable in a relatively short period of time. Carbon contained in the biomass resources is derived from $CO^2$ absorbed from the atmosphere during the process when the biomass grows to carry out photosynthesis, so that the biomass resources have the function of maintaining the balance of $CO^2$ concentration in the air. Further, most of the biomass resources are biodegradable, so that some biomass plastic products produced from the biomass resources can be disposed of in landfills after use. In particular, using the biomass resources can reduce used amounts of the fossil resources. Thus, using the biomass resources can reduce loads to the environment.

Conventionally, attempts to produce molded parts from biodegradable resins made from the biomass resources are mainly made considering mechanical properties of the biodegradable resins while attempts to use the biodegradable resins in the field of electric wires for automobile use are seldom made (see PTL 1).

CITATION LIST

Patent Literature

PTL 1: Patent JP 2007-191547

SUMMARY OF INVENTION

Technical Problem

When using the biodegradable resins in the field of electric wires for automobile use, not only mechanical properties required of electric wires but also water resistance are required of the electric wires for automobile use, considering the peculiarities of sites where the electric wires for automobile use are used. However, the biodegradable resins are made of polyester, and thus do not have sufficient water resistance because of their molecular structures.

The present invention is made in view of the problem described above, and an object of the present invention is to provide an insulated wire that is capable of reducing loads to the environment by containing a renewable biomass resource, and has excellent water resistance even if containing the biomass resource.

Solution to Problem

To achieve the objects and in accordance with the purpose of the present invention, an insulated wire of the present invention includes a conductor and an insulator that coats the perimeter of the conductor, wherein the insulator is made from a resin composition that contains a biodegradable resin having a repeating unit structure represented by the following general formula (1), and a repeating unit structure represented by the following general formula (2);

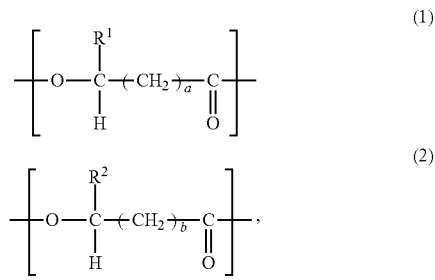

wherein each of $R^1$ and $R^2$ represents an alkyl group having one or more carbon atoms, and each of a and b represents a natural number of one or more.

It is preferable that at least one of $R^1$ and $R^2$ represents an alkyl group having two or more carbon atoms in the general formulae (1) and (2). In this case, it is preferable that a=b=one in the general formulae (1) and (2). In this case, it is preferable that $R^1$ represents an alkyl group having one carbon atom in the general formula (1). In addition, it is preferable that $R^2$ represents an alkyl group having two or three carbon atoms in the general formula (2).

Advantageous Effects of Invention

Including the insulator coating the perimeter of the conductor, which is made from the resin composition that contains the biodegradable resin having the specific repeating unit structures represented by the general formulae (1) and (2), the insulated wire of the present invention is capable of reducing loads to the environment, and has excellent water resistance even though the insulator is made from the biomass resource.

If at least one of $R^1$ and $R^2$ represents an alkyl group having two or more carbon atoms in the general formulae (1) and (2), the carbon atoms of the side chains increase to further improve the water resistance. In addition, the biodegradable resin has a sufficient biodegradable property even when improved in water resistance.

In addition, if a=b=one in the general formulae (1) and (2), the biodegradable resin has repeating unit structures of 3-hydroxyalkanoate to have the advantage of easy availability. In this case, when $R^1$ represents the alkyl group having one carbon atom in the general formula (1), the biodegradable resin has repeating unit structures of 3-hydroxybutyrate to have an excellent biodegradable property. In addition, if $R^2$ represents an alkyl group having two or three carbon atoms in the general formula (2), the biodegradable resin contains a copolymer of 3-hydroxyalkanoate containing 3-hydroxybutyrate. Thus, the biodegradable resin is capable of satisfying the strength required of the insulator of the insulated wire.

DESCRIPTION OF EMBODIMENTS

Next, a detailed description of preferred embodiments of the present invention will be provided.

Examples of the configuration of an insulated wire of the present invention include a configuration of including a conductor of annealed copper wires, and an insulation layer that coats the perimeter of the conductor, and a configuration of including shielded conductor including a conductor, an insulation layer, and a braid that coats the perimeter of the insulation layer, and a sheath that coats the perimeter of the shielded conductor.

An insulator made from a resin composition of the present invention (referred to also as the present composition) is favorably used for the insulation layer of the insulated wire, or for the sheath of the insulated wire, or for both of the insulation layer and the sheath.

The present composition contains a specific biodegradable resin. The specific biodegradable resin is produced from a biomass resource. Biomass resources define renewable organic resources of biologic origin, excluding fossil resources. Examples of the specific biodegradable resin include a biodegradable resin of which a part of the structure is a biodegradable resin produced from a biomass resource, and a biodegradable resin of which the entire structure is produced from a biomass resource.

The specific biodegradable resin has a repeating unit structure represented by the following general formula (1), and a repeating unit structure represented by the following general formula (2). To be specific, the specific biodegradable resin defines polyhydroxyalkanoate that has repeating unit structures of hydroxyalkanoate having four or more carbon atoms. In each of the unit structures, the alkylated site increases more than the polylactic acid, whereby it is assumed that the specific biodegradable resin is improved in water repellency to have improved water resistance.

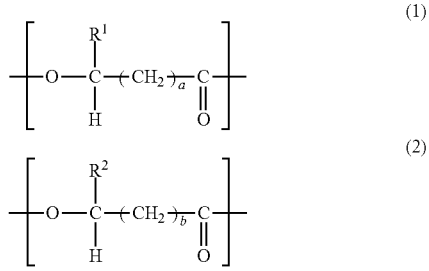

In the formulae, each of $R^1$ and $R^2$ represents an alkyl group having one or more carbon atoms. The alkyl group preferably defines a linear alkyl group, or a branched alkyl group. In the formulae, each of a and b represents a natural number of one or more.

It is preferable that the specific biodegradable resin has the repeating unit structures represented by the general formulae (1) and (2). It is also preferable that the specific biodegradable resin has one or more kinds of repeating unit structures other than the repeating unit structures represented by the general formulae (1) and (2).

Examples of the other repeating unit structures include lactate derived from lactic acid, and cellulose acetate. When the specific biodegradable resin has the other repeating unit structures, the content ratio of the other repeating unit structures is preferably less than 10%, and more preferably less than 5% considering that water resistance is secured.

More preferably used is the specific biodegradable resin that has the repeating unit structures represented by the general formulae (1) and (2), considering that excellent water resistance is acquired.

It is preferable that the structures represented by the general formulae (1) and (2) are same. It is also preferable that the structures represented by the general formulae (1) and (2) are different from each other. More preferably used are the structures represented by the general formulae (1) and (2) that are different from each other, considering that physical properties can be easily improved.

When the structures represented by the general formulae (1) and (2) are different from each other, assuming that the structure represented by the general formula (1) is A, and the structure represented by the general formula (2) is B, the specific biodegradable resin may be a block polymer represented by the following formula (3), or may be a random polymer represented by the following formula (4). In the formula (3), each of m and n represents a natural number of one or more. To be specific, the formula (3) represents a copolymer of a block, which has structures represented by the general formula (1) that are repeated by m, and a block, which has structures represented by the general formula (2) that are repeated by n.

It is preferable that each of $R^1$ and $R^2$ has ten or less carbon atoms in the general formulae (1) and (2). In addition, it is preferable that each of a and b represents a natural number of ten or less in the general formulae (1) and (2). If the carbon atoms of $R^1$ and $R^2$, and a and b are more than ten, the biodegradable resin is not easily produced to have a decreased productivity rate.

It is preferable that at least one of $R^1$ and $R^2$ represents an alkyl group having two or more carbon atoms in the general formulae (1) and (2), and more preferable that at least one of $R^1$ and $R^2$ represents an alkyl group having three or more carbon atoms. The carbon atoms of the side chains increase to further improve the water resistance. It is assumed that this improvement is made because the biodegradable resin is improved in water repellency by the increased carbon atoms of the side chains. In addition, the biodegradable resin has a sufficient biodegradable property even when improved in water resistance.

In addition, it is preferable that a=b=one in the general formulae (1) and (2). In this case, the biodegradable resin defines poly-3-hydroxyalkanoate that has repeating unit structures of 3-hydroxyalkanoate derived from a 3-hydroxy-carboxylic acid represented by the following formula (5). In the formula (5), $R^3$ represents an alkyl group having one or more carbon atoms. Synthesized from methane gas within cells of microorganism, for example, the poly-3-hydroxyalkanoate has the advantage of easy availability. The poly-3-hydroxyalkanoate produced by microorganism is mainly poly-3-hydroxybutyrate; however, poly-3-hydroxyalkanoate of various kinds can be produced by changing a nutrient source.

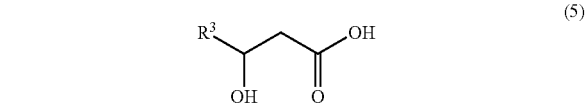

When the at least one of $R^1$ and $R^2$ represents the alkyl group having two or more carbon atoms in the general formulae (1) and (2), it is preferable that a=b=one.

When a=b=one in the general formulae (1) and (2), it is preferable that each of the alkyl group represented by $R^1$ and $R^2$ has five or less carbon atoms. This is because the biodegradable resin has the advantage of easy production under this condition.

In addition, when a=b=one in the general formulae (1) and (2), it is preferable that $R^2$ represents the alkyl group having two or more carbon atoms in the general formula (2), and $R^1$ represents an alkyl group having one carbon atom in the general formula (1). In this case, having repeating unit structures of 3-hydroxybutyrate, the biodegradable resin has an excellent biodegradable property.

In addition, when a=b=one in the general formulae (1) and (2), it is preferable that $R^1$ represents the alkyl group having one carbon atom in the general formula (1), and $R^2$ represents an alkyl group having two or three carbon atoms in the general formula (2). In this case, the biodegradable resin contains a copolymer of 3-hydroxyalkanoate containing 3-hydroxybutyrate. Thus, the biodegradable resin is capable of satisfying the strength required of the insulator of the insulated wire.

In the specific biodegradable resin, examples of the unit structures represented by the general formulae (1) and (2) include a 3-hydroxybutyric acid, a 3-hydroxyvaleric acid, a 3-hydroxyhexanoic acid, and a 3-hydroxyheptanoic acid.

The specific biodegradable resin can be produced preferably by extracting cultured microorganism.

In the present composition, only the specific biodegradable resin may be contained as a resin ingredient, or not only the specific biodegradable resin but also other resin ingredients may be contained as necessary within a range of not impairing the physical properties of the present composition. Examples of the other resin ingredients include a polyvinyl chloride resin, an olefin resin, another biodegradable resin, and a polyamide resin.

When the present composition contains the other resin ingredients, the content of the specific biodegradable resin is not limited specifically; however, the content is preferably 5% by mass or more, more preferably 10% by mass or more, and yet more preferably 15% by mass or more with respect to the resin ingredients of the present composition from the viewpoint of reducing loads to the environment by using a biomass resource.

A commercialized product can be used for the polyvinyl chloride resin. Examples of the commercialized product include "ELASLEN" series manufactured by SHOWA DENKO K.K., and "RYURON" series manufactured by TAIYO VINYL CORPORATION. The polyvinyl chloride resin of a single kind may be used alone, or the polyvinyl chloride resins of two or more kinds may be used in combination.

The polyvinyl chloride resin may contain a plasticizer. Examples of the plasticizer include dimethyl phthalate (DMP), diethyl phthalate (DEP), dibutyl phthalate (DBP), diisodecyl phthalate (DINP), and di-2-ethylhexyl phthalate (DOP).

Examples of the olefin resin include a polyolefin such as a polyethylene and a polypropylene, an ethylene copolymer such as an ethylene-vinyl acetate copolymer (EVA) and an ethylene-ethyl acrylate copolymer (EEA), and a propylene copolymer such as a propylene-vinyl acetate copolymer and a propylene-ethyl acrylate copolymer. Examples of the polyethylene include low density polyethylene, high density polyethylene, and linear low density polyethylene, and metallocene polyethylene. Examples of the polypropylene include homo polypropylene, block polypropylene, and random polypropylene. The olefin resin may be denatured by an acid anhydride or a carboxylic acid, or may not be denatured.

The polypropylene is preferably used as the olefin resin because a composition excellent in wear resistance can be made therefrom. Among polypropylenes, a block copolymer of a polyethylene and a polypropylene (a block polypropylene) is more preferably used as the olefin resin because a composition can be made therefrom, in which a harmonious balance is maintained between cold resistance and wear resistance.

Examples of the another biodegradable resin include aliphatic polyesters other than the specific biodegradable resin, derivatives thereof, polysaccharides, and derivatives thereof. Examples of the another biodegradable resin include a polylactic acid, a polybutylene succinate, a cellulose, and a cellulosic derivative such as a cellulose acetate. The cellulose and the cellulosic derivative are obtained from wood, and are not edible, so that a trade-off problem between food and wood does not arise.

The present composition may contain a dehydrating agent in addition to the ingredients described above as necessary within a range of not impairing the physical properties. The dehydrating agent have the function of, when the insulator of the insulated wire is immersed in water, taking in the water to prevent the specific biodegradable resin from being brought in contact with the water. Thus, even if the insulator is brought in contact with the water, hydrolytic degradation of the specific biodegradable resin in the insulator can be prevented. Thus, the composition is improved in water resistance as containing the specific biodegradable resin. In addition, the composition is improved in water resistance because the specific biodegradable resin is prevented from being brought in contact with water.

Examples of the dehydrating agent include carbodiimide, benzotriazole, succinimide, and derivatives thereof. The dehydrating agent of a single kind may be used alone, or the dehydrating agents of two or more kinds may be used in combination. Among the dehydrating agents, the carbodiimide and its derivative are preferably used because they can more effectively prevent hydrolytic degradation of the specific biodegradable resin.

Examples of the carbodiimide and its derivative include dicyclohexylcarbodiimide, diisopropylcarbodiimide, 1-ethyl-3-(3-dimethylaminopropyl)carbodiimide hydrochloride, 3-(dimethylamino) propyl ethyl carbodiimide, tert-butyl ethyl carbodiimide, and di-tert-butyl carbodiimide. Among them, the dicyclohexylcarbodiimide and the diisopropylcarbodiimide are preferably used because they can be produced in quantity.

Examples of the benzotriazole and its derivative include hydroxybenzotriazole, 1-hydroxy-7-azabenzotriazole, 1-(methoxymethyl)-1H-benzotriazole, and 1-(chloromethyl)-1H-benzotriazole.

Examples of the succinimide and its derivative include N-hydroxysuccinimide, N-(bromoacetoxy) succinimide, N-bromosuccinimide, and ortho-(2-chlorobenzyloxycarbonyl)-N-hydroxysuccinimide.

The content of the dehydrating agent is preferably within 0.1 to 20 parts by mass with respect to 100 parts by mass of the resin ingredients containing the specific biodegradable resin, more preferably within 1 to 15 parts by mass, and yet more preferably within 3 to 15 parts by mass. If the dehydrating agent content is less than 0.1 parts by mass, the effect of improving the water resistance is apt to be lessened. On the other hand, even if the dehydrating agent content is more than 20 parts by mass, the effect of improving the water resistance is not improved any more. In addition, compatibility between the dehydrating agent and the resin ingredients containing the specific biodegradable resins decreased, so that the insulator tends to have reduced wear resistance and marred surface appearance The present composition may contain an additive in addition to the ingredients described above as necessary within a range of not impairing the physical properties. Examples of the additive include a flame retardant, an antioxidant, a copper inhibitor (metal deactivator), an ultraviolet absorber, an ultraviolet-concealing agent, a processing aid (e.g., wax), a coloring agent, a compatibility accelerator, and a plasticizer. Examples of the flame retardant include a nitrogen flame retardant, a halogenous flame retardant, and a metallic hydrate.

Examples of the nitrogen flame retardant include melamineisocyanurate. The content of the nitrogen flame retardant is preferably 5 to 100 parts by mass with respect to 100 parts by mass of the resin ingredients because the composition can have sufficient flame retardancy required of the insulated wire for automobile use. The nitrogen flame retardant content is more preferably 10 to 95 parts by mass, and yet more preferably 15 to 90 parts by mass with respect to 100 parts by mass of the base resins.

Examples of the halogenous flame retardant include ethylenebis(pentabromobenzene). The content of the halogenous flame retardant is preferably 5 to 90 parts by mass with respect to 100 parts by mass of the resin ingredients because the composition can have sufficient flame retardancy required of the insulated wire for automobile use. The halogenous flame retardant content is more preferably 10 to 85 parts by mass, and yet more preferably 15 to 80 parts by mass with respect to 100 parts by mass of the base resins.

Examples of the metallic hydrate include magnesium hydroxide, aluminum hydroxide, and calcium hydroxide. Among them, the magnesium hydroxide is especially preferably used. The metallic hydrate has an average particle size of preferably 0.1 to 20 μm, more preferably 0.2 to 10 μm, and yet more preferably 0.5 to 5 μm. If the average particle size is less than 0.1 μm, secondary cohesion between particles occurs to demonstrate a tendency to degrade mechanical properties of the present composition. If the average particle size is more than 20 μm, the insulated wire is liable to have marred surface appearance.

The content of the metallic hydrate is preferably 30 to 250 parts by mass with respect to 100 parts by mass of the resin ingredients because the composition can have sufficient flame retardancy required of the insulated wire for automobile use. The metallic hydrate content is more preferably 50 to 200 parts by mass, and yet more preferably 60 to 180 parts by mass with respect to 100 parts by mass of the base resins.

It is preferable that the metallic hydrate is subjected to surface treatment using an organic polymer. Examples of the organic polymer include an olefin resin. Examples of the olefin resin used as the surface treatment agent for the metallic hydrate include the above-described olefin resins that are used favorably as the matrix polymer of the present composition together with the specific biodegradable resin, a homopolymer or copolymer of alpha-olefin such as 1-heptene, 1-octane, 1-nonene and 1-decene, and a mixture thereof.

The surface treatment agent for the metallic hydrate may be modified by a carboxylic acid. Examples of the modification include acid modification such that a carboxylic group (acid) is introduced into the above-described alpha-olefin polymer using a modifying agent such as an unsaturated carboxylic acid and a derivative thereof. Specific examples of the modifying agent include a maleic acid and a fumaric acid, which define the unsaturated carboxylic acid, and a maleic acid anhydride (MAH), a maleic acid monoester and a maleic acid diester, which define the derivative. Among them, the maleic acid and the maleic acid anhydride are preferably used. The modifying agent of a single kind may be used alone, or the modifying agents of two or more kinds may be used in combination.

Examples of a method of introducing the acid into the surface treatment agent include a graft method, and a direct method. The amount of the used acid, on a percentage by mass basis of the used modifying agent, is normally 0.1 to 20% by mass with respect to the polymer, preferably 0.2 to 10% by mass, and yet more preferably 0.2 to 5% by mass.

A method for surface-treating the metallic hydrate with the surface treatment agent is not limited specifically. A variety of surface treatment methods can be used. Examples of the method for surface-treating the metallic hydrate include a surface treatment method such that surface treatment is conducted at the time of pulverizing the metallic hydrate, and a surface treatment method such that the metallic hydrate is pulverized in advance, and then the pulverized metallic hydrate is mixed with the surface treatment agent to be subjected to surface treatment. The surface treatment method is preferably a wet method using a solvent, or a dry method using no solvent.

Examples of the solvent used in the wet method include an aliphatic hydrocarbon such as pentane, hexane and heptane, and an aromatic hydrocarbon such as benzene, toluene and xylene. In addition, examples of the method for surface-treating the metallic hydrate include a surface treatment method such that the surface treatment agent is added to the metallic hydrate and the base resins at the time of preparing the present composition, and the metallic hydrate is surface-treated at the time of kneading the composition.

The insulated wire of the present invention can be preferably produced by extruding and molding the present composition on the perimeter of the conductor. The method for preparing the present composition is not limited specifically, and a known method can be used. For example, the present composition can be prepared by melting and kneading and uniformly dispersing the essential ingredients and optional ingredients of the present composition with the use of a regular kneader such as a Banbury mixer, a pressure kneader, a kneading extruder, a twin screw extruder, and a roll.

The insulated wire of the present invention having the configuration described above includes the insulator made from the biomass resource, so that a used amount of fossil resources in the insulated wire of the present invention can be reduced compared with a conventional insulated wire. In addition, the biomass resource is renewable in a relatively short period of time compared with the fossil resources, and is carbon-neutral, so that the insulated wire of the present invention is capable of reducing loads to the environment more than a conventional insulated wire.

Including the insulator made from the specific biodegradable resin, the insulated wire of the present invention is capable of reducing loads to the environment, and has excellent water resistance even though the insulator is made from the biomass resource. The specific biodegradable resin has the unit structures, in each of which the alkylated site increases more than the polylactic acid, whereby it is assumed that the specific biodegradable resin is improved in water repellency to have improved water resistance.

EXAMPLE

A description of the present invention will now be specifically provided with reference to Examples. However, the present invention is not limited thereto.

(Synthesis of Biodegradable Resins <1> to <6>)

Biodegradable resins <1> to <6> having structures represented by the following general formula (6) were synthesized by changing fermentation conditions of microorganism cultivation. The structures of the synthesized biodegradable resins were identified by a proton NMR method, a carbon NMR method, or an IR method. In the general formula (6), m represents a percentage (a natural number of one to hundred) of the repeating unit structures represented by the general formula (1), each of $R^1$ and $R^2$ represents an alkyl group having one or more carbon atoms, and each of a and b represents a natural number of one or more.

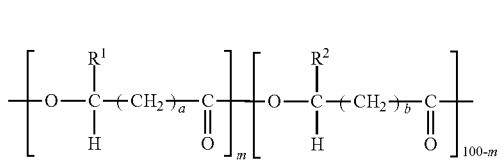

(6)

(Other Biomass Plastic Ingredients)
Polylactic acid (V351X51) manufactured by TORAY INDUSTRIES., INC.
Polylactic acid (V554R10) manufactured by TORAY INDUSTRIES., INC.
Polylactic acid (TCA8070MN) manufactured by UNITIKA LTD.
Cellulose acetate (15300-26) manufactured by DAICEL CORPORATION
Cellulose acetate (15300-31) manufactured by DAICEL CORPORATION
Polybutylene succinate (NF01U) manufactured by CHEMITECH INC.
Polybutylene succinate (BIONOLLE1020) manufactured by SHOWA HIGHPOLYMER CO., LTD.
(Additive)
Antioxidant (IRGANOX 1010) manufactured by CIBA SPECIALTY CHEMICALS INC.

Examples 1 to 6

Resin compositions were prepared by mixing the specific biodegradable resins and the additives, which have the compositions (parts by mass) shown in Table 1, with the use of a double-shaft kneader at 200 degrees C., and then the resin compositions were formed into pellets using a pelletizing machine. Conductors (having a cross sectional area of 0.5 $mm^2$), each of which was a soft-copper strand prepared by bunching seven soft copper wires, were extrusion-coated with insulators made from the pellets of the resin compositions so as to have a thickness of 0.2 mm with the use of an extrusion molding machine. Thus, insulated wires of Examples 1 to 6 were obtained.

Comparative Examples 1 to 7

Insulated wires of Comparative Examples 1 to 7 were obtained in the same manner as the Examples, except that the other biomass plastic ingredients were used instead of the specific biodegradable resins.

The insulated wires of the Examples and the Comparative Examples were subjected to a cold-resistance test and a water-resistance test. The test results are shown in Tables 1 and 2. The cold-resistance test and the water-resistance test were performed as follows.

[Cold-Resistance Test Method]
The cold-resistance test was performed in accordance with the JIS C3005. To be specific, each of the insulated wires of the Examples and the Comparative Examples was cut into a test specimen 38 mm long. Five test specimens were prepared for each of the insulated wires of the Examples and the Comparative Examples. Each test specimen was set in a cold-resistance test machine and hit with a striking implement while being cooled to a given temperature, and the state after hit of each test specimen was observed. The temperature at the time when all of the five test specimens were broken was determined as the cold-resistance temperature of the insulated wire.

[Water-Resistance Test Method]
The water-resistance test was performed in accordance with the ISO 6722. To be specific, each of the insulated wires of the Examples and the Comparative Examples was immersed in hot water at 80 degrees C. for five weeks, and then an insulation resistance value of each insulator was measured. The insulated wires that had an insulation resistance value of $1 \times 10^9$ Ω·mm or more were regarded as passed. The insulated wires that had an insulation resistance value less than $1 \times 10^9$ Ω·mm were regarded as failed.

TABLE 1

| | Carbon atom | | | | | Example | | | | | |
|---|---|---|---|---|---|---|---|---|---|---|---|
| | $R^1$ | $R^2$ | a | b | m | 1 | 2 | 3 | 4 | 5 | 6 |
| Biodegradable resin <1> | 10 | 8 | 10 | 10 | 60 | 100 | — | — | — | — | — |
| Biodegradable resin <2> | 5 | 3 | 5 | 5 | 70 | — | 100 | — | — | — | — |
| Biodegradable resin <3> | 5 | 8 | 1 | 1 | 60 | — | — | 100 | — | — | — |
| Biodegradable resin <4> | 1 | 2 | 1 | 1 | 80 | — | — | — | 100 | — | — |
| Biodegradable resin <5> | 3 | 1 | 1 | 1 | 95 | — | — | — | — | 100 | — |
| Biodegradable resin <6> | 1 | 3 | 1 | 1 | 95 | — | — | — | — | — | 100 |
| Antioxidant (IRGANOX 1010) | | | | | | 1 | 1 | 1 | 1 | 1 | 1 |
| Colde resistance (° C.) | | | | | | −30 | −25 | −30 | −25 | −25 | −20 |
| Water resistance | | | | | | Passed | Passed | Passed | Passed | Passed | Passed |

TABLE 2

| | Comparative Example | | | | | | |
|---|---|---|---|---|---|---|---|
| | 1 | 2 | 3 | 4 | 5 | 6 | 7 |
| Polylactic acid (V351X51) | 100 | — | — | — | — | — | — |
| Polylactic acid (V554R10) | — | 100 | — | — | — | — | — |
| Polylactic acid (TCA8070MN) | — | — | 100 | — | — | — | — |

TABLE 2-continued

| | Comparative Example | | | | | | |
|---|---|---|---|---|---|---|---|
| | 1 | 2 | 3 | 4 | 5 | 6 | 7 |
| Cellulose acetate (15300-26) | — | — | — | 100 | — | — | — |
| Cellulose acetate (15300-31) | — | — | — | — | 100 | — | — |
| Polybutylene succinate (NF01U) | — | — | — | — | — | 100 | — |
| Polybutylene succinate (BIONOLLE1020) | — | — | — | — | — | — | 100 |
| Antioxidant (IRGANOX 1010) | 1 | 1 | 1 | 1 | 1 | 1 | 1 |
| Colde resistance (° C.) | −30 | −20 | −25 | −25 | −30 | −25 | −25 |
| Water resistance | Failed | Failed | Failed | Failed | Failed | Failed | Failed |

Each of the insulators of the insulated wires of the Comparative Examples was made from the resin ingredient consisting any one of the polylactic acid, the cellulose acetate, and the polybutylene succinate, and thus inferior in water resistance. Meanwhile, each of the insulators of the insulated wires of the Examples was made from the resin ingredient of the specific biodegradable resin, and thus excellent in water resistance while having cold resistance.

Therefore, it is shown that the insulated wires of the present invention are capable of reducing loads to the environment by containing the renewable biomass resource, and have excellent water resistance even if containing the biomass resource.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. An insulated wire, which comprises a conductor, and an insulator that coats the perimeter of the conductor,
wherein the insulator is made from a resin composition that contains a biodegradable resin having a repeating unit structure represented by the following general formula (1), and a repeating unit structure represented by the following general formula (2);

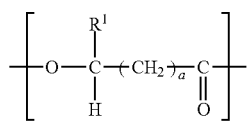 (1)

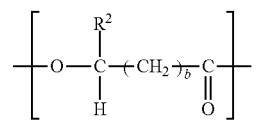 (2)

wherein each of $R^1$ and $R^2$ represents an alkyl group having one or more carbon atoms, and each of a and b represents a natural number of one or more, wherein at least one of the alkyl groups represented by $R^1$ and $R^2$ has three or more carbon atoms, and wherein the resin composition comprises only the biodegradable resin as a resin ingredient.

2. The insulated wire according to claim 1,
wherein a=b=one in the general formulae (1) and (2).

3. The insulated wire according to claim 2,
wherein $R^1$ represents an alkyl group having one carbon atom in the general formula (1).

4. The insulated wire according to claim 3,
wherein $R^2$ represents an alkyl group having three carbon atoms in the general formula (2).

5. The insulated wire according to claim 1, wherein the biodegradable resin has only the repeating unit structure represented by the general formula (1), and the repeating unit structure represented by the general formula (2), as repeating units.

* * * * *